United States Patent [19]

Brändle et al.

[11] Patent Number: 5,066,097
[45] Date of Patent: Nov. 19, 1991

[54] CONNECTOR FOR AN OPTICAL CABLE

[75] Inventors: Hubert Brändle, Otelfingen; Lothar Schultheis, Fislisbach; Walter Rüegg, Endingen, all of Switzerland

[73] Assignee: ASEA Brown Boveri Ltd., Baden, Switzerland

[21] Appl. No.: 566,767

[22] Filed: Aug. 14, 1990

[30] Foreign Application Priority Data

Sep. 14, 1989 [CH] Switzerland .................. 3362/89

[51] Int. Cl.⁵ .............................................. G02B 6/40
[52] U.S. Cl. ........................................ 385/76; 385/54; 385/100
[58] Field of Search ................... 350/96.20, 96.22

[56] References Cited

U.S. PATENT DOCUMENTS

| 3,663,822 | 5/1972 | Uchida | 250/217 S |
| 4,595,839 | 6/1986 | Braun et al. | 250/551 |
| 4,756,590 | 7/1988 | Forrest et al. | 350/96.15 |
| 4,861,134 | 8/1989 | Alameel et al. | 350/96.20 |

OTHER PUBLICATIONS

Electronics, vol. 49; No. 18, Sep. 2, 1976, pp. 94-99; H. Schmid, "Fiber-Optic Data Transmission: A Practical, Low-Cost Technology".

Primary Examiner—William L. Sikes
Assistant Examiner—Robert E. Wise
Attorney, Agent, or Firm—Oblon, Spivak, McClelland, Maier & Neustadt

[57] ABSTRACT

A connector (2) for an optical cable (1) having at least one glass fiber (4.1, 4.2) is characterized in that the plug contact is electrical and the signal transmission is optical. For this purpose, an electrical plug contact (5.1, 5.2) is provided for the at least one glass fiber (4.1, 4.2), as well as a first converter for converting an electrical signal into an optical signal and/or a second converter for converting an optical signal into an electrical signal. The at least one glass fiber (4.1, 4.2) of the optical cable (1) is connected directly to the the first and second converters, respectively. The first and second converters, respectively, are e.g. embodied by light-emitting diodes and photodiodes, respectively.

10 Claims, 2 Drawing Sheets

CONNECTOR FOR AN OPTICAL CABLE

BACKGROUND OF THE INVENTION

1. Field of the Invention

The invention relates to a connector for an optical cable having at least one glass fiber.

2. Discussion of Background

In comparison with conventional electrical signal transmission, optical data transmission offers a number of advantages. The most important include, inter alia, the following:

high degree of immunity to interference in an electromagnetically contaminated environment;
high bandwidth and high data rates;
low space requirement;
low power requirement.

Optical signal transmission is therefore being used ever more widely. An important field is the communication (e.g. between EDP systems) on a local level (local area networks).

However, a problem in the realization of optical data links continues to be the plug connection of optical cables. In manufacturing terms, optical connectors are much more demanding than electrical connectors and accordingly they are also much more expensive.

Moreover, optical plug connections are sensitive to contamination of the contact surfaces.

A largely unsolved problem hitherto is the construction of an optical multiple connector. While electrical multiple connectors with a large number of parallel lines are inexpensive and are highly reliable, there is nothing similar in the optical field. It is therefore usually necessary to seek the assistance of fast multiplexers to be able to achieve despite this a kind of parallel connection via optical lines.

As already mentioned, the low space requirement is an important advantage of optical communication. While a (conventional) coaxial cable has a diameter of several mm, that of a glass fiber lies in the region of 1/10 mm. In view of the endeavors being made in the direction of integrated optics, an enormous space-saving potential can be expected for optical communication. A summary of the integrated optical components currently available can be found, e.g. in the article "Bauelemente der integrierten Optik: Eine Einführung" [Components in integrated optics: an introduction], W. Sohler, Laser und Optoelektronik, No. 4, 1986, pp 323-337.

SUMMARY OF THE INVENTION

Accordingly, one object of this invention is to provide a novel connector of the type mentioned at the beginning which takes up little space, is suitable for a large number of parallel optical data lines and avoids the disadvantages of the prior art.

According to the invention, this is achieved in that a) at least one electrical plug contact is provided for the at least one glass fiber, b) first means for converting an electrical signal into an optical signal and/or second means for converting an optical signal into an electrical signal are provided, and c) the at least one glass fiber of the optical cable is connected directly to the first and/or second means.

The core of the invention lies in the fact that the advantages of the electrical plug contact are combined with those of optical data transmission. The user has a cable in front of him which looks like an electrical one and is accordingly simple to use, but which internally uses optical data transmission. A cable of this type can thus be used without problem instead of the conventional, purely electrical one.

An important aspect in connection with optical data transmission emerges from the fact that data processing will also continue to operate in the near future primarily on the basis of electronic circuits, and hence electrical signals. Although the large number of functional optical components (see, e.g., W. Sohler cited) demonstrates the progressive development, but cannot hide the fact that although the signals are transmitted optical, it is subsequently necessary to convert them back into electrical signals again.

According to an advantageous embodiment, the optical cable comprises a plurality of glass fibers. In addition, the electrical plug contacts are part of an electrical multiple connector. A carrier equipped with guide means is provided for aligning and fixing the glass fibers in the connector. The advantage of this embodiment is that it is a simple matter to manufacture the carrier (mechanical engraving, etching, etc.) and it permits a precise alignment of the fiber ends with corresponding light sources.

The first means preferably comprises electrooptical transmitters, e.g. light-emitting diodes (LED), attached directly to the glass fibers, and the second means preferably comprises optoelectronic receivers, e.g. photodiodes (PD), attached directly to the glass fibers. The optimum injection and coupling out of light, respectively, achieved in this way makes it possible to operate with low power. Accordingly, thermal losses in the connector can be kept small.

In a further embodiment, the first and second means respectively comprise an array of electrooptical transmitters (e.g. light-emitting diodes) and optoelectronic receivers (e.g. photodiodes), respectively, which are integrated in each case on a common semiconductor substrate. Owing to its small manufacturing/assembly outlay, this integrated solution is particularly preferred.

With respect to as low a power loss as possible in the connector, it is advantageous if the first means comprises at least one integrated optical switch controlled by a signal of a corresponding plug contact, and if a common light source is provided for a plurality of glass fibers, the light required for the signal transmission being supplied from said light source to the connector by means of an additional light guide and being distributed to the at least one integrated optical switch. An additional light guide is provided to supply the light required for signal transmission.

Instead of an external light source, it is also possible to provide a common light source in the connector for a plurality of glass fibers, the light required for the signal transmission being distributed to the at least one integrated optical switch from said light source. This embodiment has the advantage of a powerless control and permits moreover a high degree of integration during manufacturing.

A connector having integrated optical switches preferably comprises a transmissive star coupler for distributing the light from the common light source, and, as integrated optical switch, an integrated Mach-Zehnder interferometer or a switchable directional coupler. In this case, the invention envisages both the possibility of assembling the connector from discrete components and the possibility of integrating individual components or a plurality of components.

Further advantageous embodiments emerge from the totality of the dependent patent claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
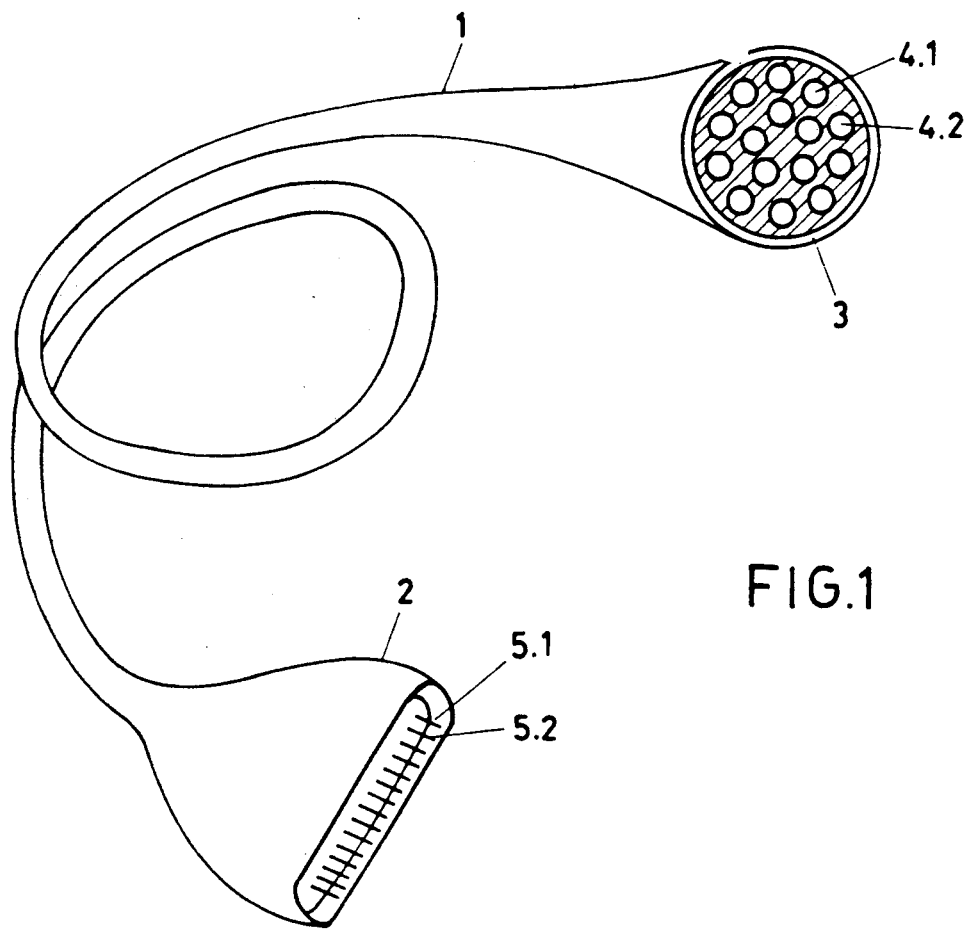
FIG. 1 shows an optical cable having a connector according to the invention.

Referring now to the drawings, wherein like reference numerals designate identical or corresponding parts throughout the several views, their meaning being listed as a summary in the list of reference numerals, FIG. 1 shows a cable 1 for optical signal transmission. It has a connector 2 according to the invention at one or both of its ends. The cable 1 has, e.g. a cladding 3 surrounding a plurality of glass fibers 4.1, 4.2. Each of these glass fibers 4.1, 4.2 is associated with an electrical plug contact 5.1, 5.2 of an electrical multiple connector. However, it is not necessarily the case that each electrical plug contact is associated with one glass fiber.

If the cable 1 is terminated at both ends with a connector according to the invention, with for example means for converting an electrical signal into an optical signal being provided in a first connector, and means for converting an optical signal into an electrical signal being provided in the second connector, then a connecting cable with electrical connectors and optical transmission is available. With said connecting cable it is possible to transmit data in parallel, to be precise in the direction from the first to the second connector.

For a bidirectional cable, both means of the first and of the second type should be provided in each of the two connectors.

Figures 2, 3:
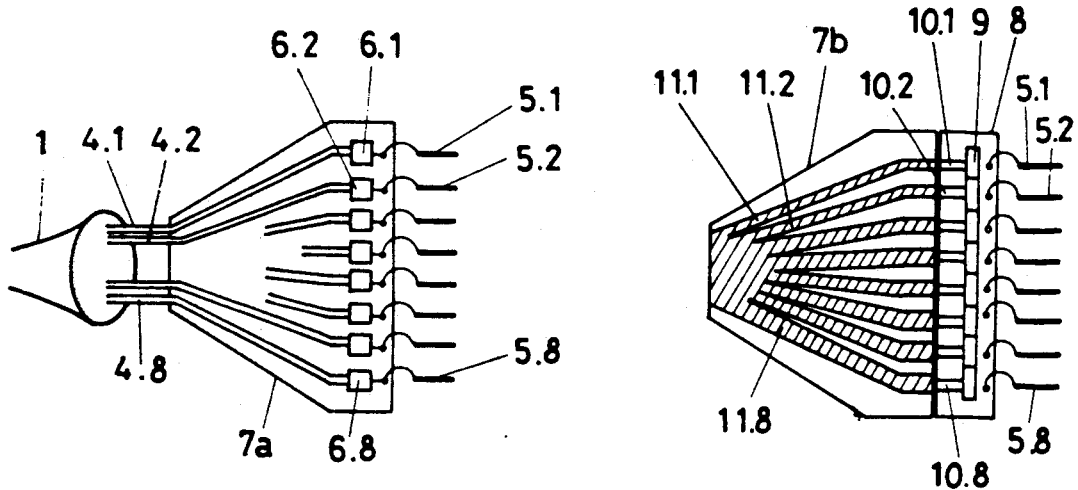
FIG. 2 shows a diagrammatic representation of a connector with means for converting an electrical signal into an optical signal.
FIG. 3 shows a diagrammatic representation of a connector, in which the means for converting the signal comprises an integrated array of light-emitting diodes integrated in a common semiconductor substrate.

FIG. 2 diagrammatically illustrates the construction of the connector according to the invention. For example, 8 glass fibers 4.1, 4.2, . . . , 4.8 project out of the optical cable 1. They fan out and at their ends they are each bonded directly to a light-emitting diode (LED) 6.1, 6.2 . . . , 6.8. The light-emitting diodes 6.1, 6.2, . . . , 6.8 may be, for example, individual components (chips) which are mounted on a carrier 7a. Each light-emitting diode 6.1, 6.2, . . . , 6.8 is electrically connected to an associated plug contact 5.1, 5.2, . . . , 5.8.

In the present case the connector is therefore the input of the cable 1. The electrical signals applied to the plug contacts 5.1, 5.2, . . . , 5.8 are converted by the light-emitting diodes 6.1, 6.2, . . . , 6.8 into optical signals, are injected into the directly connected glass fibers, 4.1, 4.2, . . . , 4.8 and are transmitted in parallel to the second connector (not shown in the Figures.). There, in turn, the optical signals are converted into electrical ones. The second connector is in this case constructed completely analogously to the connector shown in FIG. 2. However, instead of light-emitting diodes, there are suitable photodiodes there which perform the optical-electrical conversion. Electrical signals can finally be picked up at corresponding plug contacts of the second connector.

In order to tolerate as little energy loss as possible, and hence avoid undesired heating of the connector, the light-emitting diodes are advantageously bonded without chip housing directly onto the ends of the glass fibers with a suitable, transparent (index-matching) adhesive. In this way, the greatest possible amount of light can be injected into the glass fibers. An assembly of this type also has a low space requirement. The protective function of the omitted chip housing can be assumed, e.g. by a weldable connector housing.

Further embodiments of the invention will now be described below.

FIG. 3 shows an embodiment in which the means for converting the signal comprises an integrated array of light-emitting diodes. An array 9 of light-emitting diodes (that is to say a row of elements arranged linearly next to one another) is integrated on a common semiconductor substrate 8. The light-emitting diodes have therefore been produced at the same time in a common manufacturing process next to one another (to be precise with a suitable mutual spacing) in the semiconductor substrate 8.

According to a particularly preferred embodiment, integrated waveguide tracks 10.1, 10.2, . . . , 10.8 are provided in addition in the semiconductor substrate 8. They receive the light from the respective light-emitting diode and terminate at a side face of the semiconductor substrate 8. The light emerging from the integrated waveguide tracks 10.1, 10.2, . . . , 10.8 is injected into the directly adjoining glass fibers of the optical cable.

In order that the glass fibers can be aligned as optimally as possible on the waveguide tracks, a carrier 7b having guide means is provided. The latter may be, e.g. embodied by V-shaped trenches, 11.1, 11.2, . . . , 11.8. Trenches of this type can be etched in or engraved very precisely without difficulty.

Conventional circuit-board materials (epoxy resins) as well as silicon or other materials used in semiconductor technology are suitable for the carrier.

During the manufacture of the connector, the individual glass fibers of the cable are placed in the trenches 11.1, 11.2, . . . , 11.8 and are tightly clamped or tightly bonded. Following this, it is then only necessary to align the carrier 7b as a whole on the semiconductor substrate, that is to say the semiconductor tracks.

The procedure for a connector in which the optical signals are converted into electrical ones can be analogous. The difference here again is that an array of photodiodes is used instead of an array of light-emitting diodes.

The guide means are solely for ensuring and facilitating a precise manufacture. Likewise, the question of which material is selected for the carrier is primarily a question of manufacturing technology. Silicon offers the advantage that a wide range of precise and efficient process methods (etching in batch mode) is available. Accordingly, it is particularly preferred for the purposes of the invention.

Figure 4:
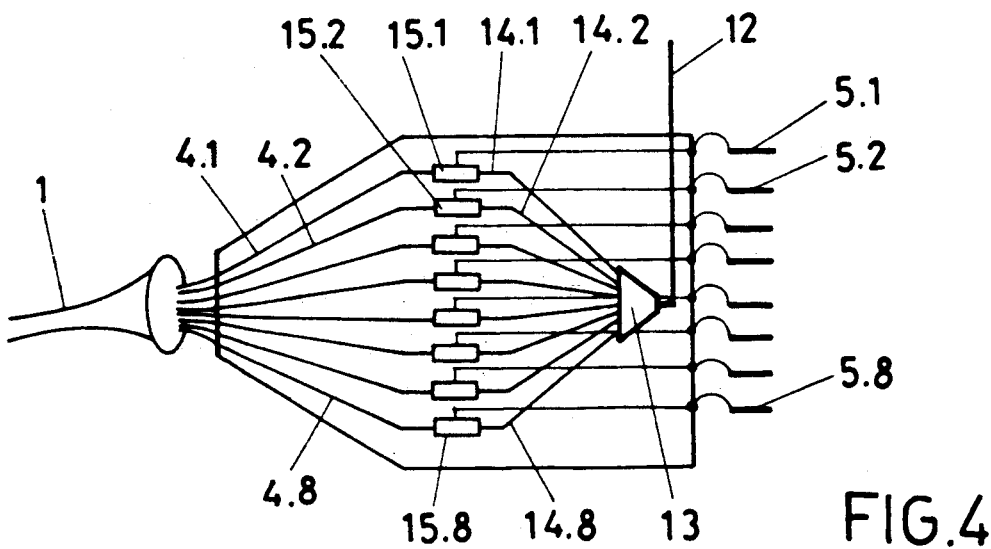
FIG. 4 shows a diagrammatic representation of a connector, in which the light is supplied via an additional light guide.

FIG. 4 shows a further preferred embodiment. In the corresponding connector, the light required for the signal transmission is not generated in the connector itself, but externally by a common light source (e.g. laser). It is then supplied to the connector by means of an additional light guide 12. Here it is distributed, e.g. with a transmissive star coupler 13, to a predetermined number (e.g. 8) of light guides 14.1, 14.2, ..., 14.8. Each light guide 14.1, 14.2 ..., 14.8 leads to an integrated optical switch 15.1, 15.2, ..., 15.8, behind which the glass fibers 4.1, 4.2, ..., 4.8 of the cable are then directly connected.

The integrated optical switches 15.1, 15.2, ..., 15.8 are controlled by the electrical signals applied to the corresponding plug contacts 5.1, 5.2, ..., 5.8. If, for example, an optical switch of the Mach-Zehnder interferometer type is used, then the light current of the corresponding light guide is interrupted when a voltage is applied. This has the advantage that the cable can be continuously monitored. If one glass fiber of the cable breaks, then this can be detected immediately at the other, receiving end of the cable.

Figure 5:
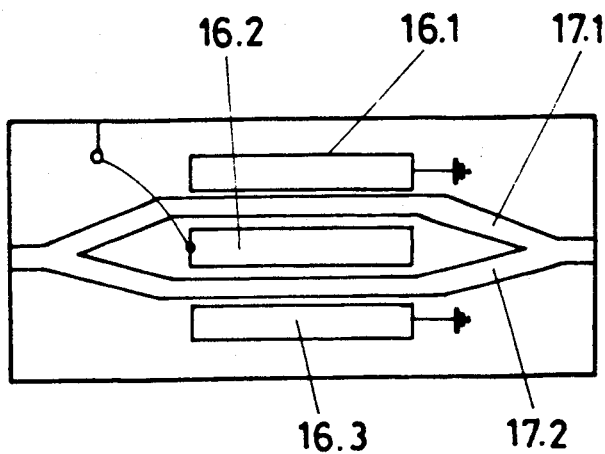
FIG. 5 shows an integrated Mach-Zehnder interferometer.

FIG. 5 shows a possible embodiment of an integrated Mach-Zehnder interferometer known per se. It has three electrodes 16.1, 16.2, 16.3 next to one another. A waveguide integrated in a LiNbO$_3$ crystal splits into two waveguide arms 17.1, 17.2, each of which runs through between two electrodes. If a voltage is now applied to the middle electrode 16.2, the light in the two waveguide arms 17.1, 17.2 is subjected to a different phase shift and at the end of the waveguide arms is superimposed in a destructive manner.

Figure 6:
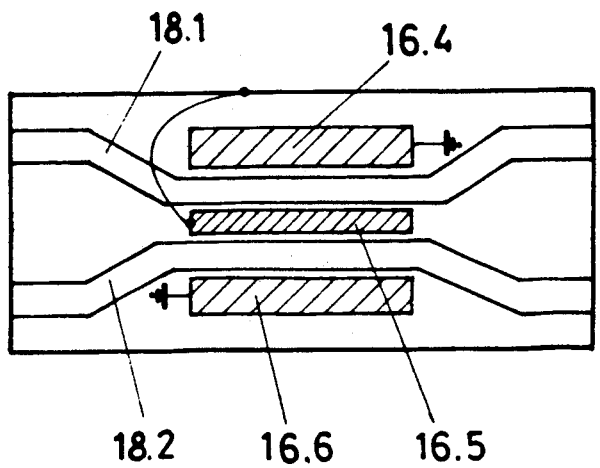
FIG. 6 shows an electrooptically switchable directional coupler.

FIG. 6 shows a further possibility for realizing an integrated optical switch. This is in this case a switchable directional coupler type of optical switch. Two waveguides 18.1, 18.2 are integrated in a suitable electrooptical substrate (e.g. LiNbO$_3$). Three electrodes 16.4, 16.5, 16.6 are arranged next to one another on the substrate. The two waveguides 18.1, 18.2 extend in a section in each case between a pair of electrodes 16.4 and 16.5, or 16.5 and 16.6, respectively, to be precise in such a way that the light from one waveguide is coupled into the other. When a voltage is applied to the middle electrode 16.5, then the propagation constant of the light changes in the substrate and the coupling of the light is disturbed or even interrupted.

For the purposes of the invention, two diametrically opposite ends of the two waveguides 18.1, 8.2 are used as optical input and optical output of the switch, respectively. If a signal is absent at the corresponding plug contact, the light supplied is injected at the output side into the glass fibers of the cable. In this way, again the possibility of continuous monitoring is available.

In the case of the directional coupler, there is however additionally the option of a redundant signal transmission. In this case, both waveguides 18.1, 18.2 must simply be connected at the output side to one glass fiber.

Both directional couplers and Mach-Zehnder interferometers are known per se (see cited articles by W. Sohler). They can also assume other forms than that described above. Together with further integrated optical switching elements not discussed here specifically, they have the advantage that they can be controlled almost without power.

According to a further embodiment, a common light source, e.g. a laser diode, is accommodated in the connector. In the representation of FIG. 4 it would be arranged where the additional lightguide 12 ends, that is to say at the input side of the star coupler. It can be supplied with electrical energy, e.g. via suitable plug contacts of the electrical multiple connector. For the rest, the present embodiment functions in the same way as that shown in FIG. 4. In particular, with a view to a higher degree of integration, the star coupler can be replaced by an integrated optical lens or by a holographic diffraction structure. Details of such integrated optical elements can be found in the article by W. Sohler, for example.

Various degrees of integration are possible for the embodiment according to FIG. 4. In a simple, discrete construction, the integrated optical switches are independent components (chips) and the lightguides 14.1, 14.2, ..., 14.8 are individual glass fiber pieces. With a higher degree of integration, e.g., the optical switches are integrated in a common substrate together with the lightguides 14.1, 14.2, ..., 14.8. Finally, it is also possible to design the star coupler in accordance with integrated optics. Further details on corresponding optical modulators (Mach-Zehnder interferometers, directional couplers and the like) can be found in the cited article by W. Sohler.

One application field of the invention is particle physics with its ever larger detector units. These must e.g. frequently be arranged as close as possible around the collision point of two particles. In a case of this type, it is therefore now of central importance that the greatest possible number of channels can be accommodated in a small cable cross-section and that in general as little loss of heat as possible is generated (problem of heat dissipation).

For instance, if a drift chamber frequently having several hundred channels is now connected with one or more connectors according to the invention, then the thermal and space problems associated with the prior art can be avoided. This is particularly the case when the light is generated externally and is supplied via an additional lightguide.

Besides nuclear physics applications, the invention has a large number of further possible uses, to be precise wherever great channel densities, high levels of immunity to interference and low electrical losses are required. The networking of high-performing computers can be stated as an example.

Given a fiber diameter of, e.g. 250 μm, a 64-pole cable can be produced without difficulty, and in terms of cross-section the latter is no greater than a conventional coaxial cable. The advantages of the invention become increasingly important the greater the number of glass fibers per connector. In principle, the invention endeavors to combine as many parallel channels as possible in one cable.

The invention comprises a large number of embodiments which cannot be described here specifically, but which readily emerge from the description for the person skilled in the art. In this connection, it should be noted that the terms glass fiber, light-emitting diode, photodiode and the like should be interpreted widely. For the principle of the invention, it is not significant whether these are monomode or multimode fibers, conventional LEDs or laser diodes, fast photodiodes or any avalanche diodes, modulators of LiNbO$_3$ semiconductor material or polymers. The essential point is the combination of electrical input (connector side) and optical output (cable side) of the connector. The user no longer has the problems known from the prior art by virtue of the fact that the tricky optical plug contact is avoided, and that the electro-optical conversion takes place in the connector itself.

In conclusion, it can be said that the invention provides a high-quality data transmission cable which can be used simply and without problems by the user.

Obviously, numerous modifications and variations of the present invention are possible in the light of the above teachings. It is therefore to be understood that within the scope of the appended claims, the invention may be practiced otherwise than as specifically described herein.

LIST OF REFERENCE NUMERALS

1—cable; 2—connector; 3—cladding; 4.1, 4.2, 4.8—glass fiber; 5.1, 5.2, 5.8—plug contact; 6.1, 6.2, 6.8—light-emitting diode; 7a, 7b—carrier; 8—semiconductor substrate; 9—array; 10.1, 10.2—waveguide tracks; 11.1, 11.2, 11.8—trenches; 12—lightguide; 13—star coupler; 14.1, 14.2, 14.8—lightguide; 15.1, 15.2, 15.8—optical switch; 16.1, 16.2, 16.3, 16.4, 16.5, 16.6—electrodes; 17.1, 17.2—waveguide arms; 18.1, 18.2—waveguide.

What is claimed as new and desired to be secured by Letters Patent of the United States is:

1. A connector for an optical cable having a plurality of glass fibers for signal transmission, comprising:
   a plurality of electrical plug contacts;
   first means for converting an electrical signal into an optical signal, having an electrical side in which said plurality of electrical plug contacts are disposed and an optical side in which said plurality of glass fibers are disposed, such that each of said plurality of electrical plug contacts is coupled to a corresponding one of said plurality of glass fibers, and having a plurality of integrated optical switches controlled by electrical signals applied to said electrical plug contacts; and
   a common light source for providing light to said plurality of glass fibers for signal transmission, said light being distributed from the common light source to said plurality of integrated optical switches and controllably transmitted to said plurality of glass fibers by said integrated optical switches.

2. A connector for an optical cable having a plurality of glass fibers for signal transmission, comprising:
   a plurality of electrical plug contacts;
   first means for converting an electrical signal into an optical signal, having an electrical side in which said plurality of electrical plug contacts are disposed and an optical side in which said plurality of glass fibers are disposed, such that each of said plurality of electrical plug contacts is coupled to a corresponding one of said plurality of glass fibers, and having a plurality of integrated optical switches controlled by electrical signals applied to said electrical plug contacts; and
   a light guide for providing light generated by an external common light source to said plurality of integrated optical switches, said light being controllably transmitted to said plurality of glass fibers by said plurality of integrated optical switches.

3. A connector as claimed in claim 1 or 2 wherein the second means comprises optoelectronic receivers attached directly to the glass fibers.

4. A connector as claimed in claim 1 or 2 wherein the second means comprises an array of optoelectronic receivers which is integrated on a common semiconductor substrate.

5. A connector as claimed in claim 1 or 2 wherein the first means comprises electrooptical transmitters attached directly to the glass fibers.

6. A connector as claimed in claim 1 or 2 wherein the first means comprises an array of electrooptical receivers which is integrated on a common semiconductor substrate.

7. A connector as claimed in claim 1 or 2, comprising second means for converting an optical signal into an electrical signal, said second means being connected on an electrical side with at least one of said electrical plug contacts and on an optical side with at least one of said glass fibers, such that each electrical plug contact connected to said second means is coupled to one corresponding glass fiber.

8. A connector as claimed in claim 1 or 2, comprising:
   an electrical multiple connector housing said plurality of electrical plug contacts; and
   a carrier equipped with guide means for aligning and fixing said plurality of glass fibers in said connector.

9. A connector as claimed in claim 1 or 2, wherein a transmissive star coupler is provided for distributing the light from the additional light guide to the integrated optical switch.

10. A connector as claimed in claim 1 or 2, wherein the first means comprises as optical switch an integrated Mach-Zehnder interferometer or an integrated switchable directional coupler.

* * * * *